(12) United States Patent
Mitterreiter

(10) Patent No.: US 7,469,478 B2
(45) Date of Patent: Dec. 30, 2008

(54) COUPLING AND ANGULAR POSITION MEASURING DEVICE USING THE COUPLING

(75) Inventor: Johann Mitterreiter, Chieming (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 101 days.

(21) Appl. No.: 11/448,499

(22) Filed: Jun. 6, 2006

(65) Prior Publication Data

US 2006/0277771 A1    Dec. 14, 2006

(30) Foreign Application Priority Data

| Jun. 11, 2005 | (DE) | .................. | 10 2005 027 071 |
| Apr. 29, 2006 | (DE) | .................. | 10 2006 020 067 |

(51) Int. Cl.
*G01B 5/24* (2006.01)
(52) U.S. Cl. ........................... 33/1 PT; 33/645
(58) Field of Classification Search ............ 33/1 N, 33/1 AP, 1 PT, 613, 645, 534, 706
See application file for complete search history.

(56) References Cited

U.S. PATENT DOCUMENTS

| 5,758,427 A | * | 6/1998 | Feichtinger et al. | ......... | 33/1 PT |
| 6,601,307 B2 | * | 8/2003 | Meyer | .................. | 33/1 PT |
| 6,668,464 B2 | | 12/2003 | Mitterreiter et al. | | |
| 6,799,375 B1 | | 10/2004 | Mitterreiter | | |
| 6,820,511 B2 | | 11/2004 | Mutschler et al. | | |
| 2006/0277771 A1 | * | 12/2006 | Mitterreiter | .................. | 33/1 N |

FOREIGN PATENT DOCUMENTS

| DE | 82 05 311 | 5/1985 |
| DE | 100 28 651 | 1/2001 |
| DE | 102 03 278 | 9/2002 |
| EP | 1 353 150 | 10/2003 |
| FR | 1 198 842 | 12/1959 |
| WO | WO 01/02808 | 1/2001 |

* cited by examiner

*Primary Examiner*—G. Bradley Bennett
(74) *Attorney, Agent, or Firm*—Kenyon & Kenyon LLP

(57) ABSTRACT

A coupling is for the connection, that is radially elastic but torsion resistant, of two component parts. The coupling includes base elements and a plurality of tabs formed integrally with the base elements at node areas. Each tab has two support points that are at a distance from one another in the circumferential direction. The node areas form the connection of the tabs to the base elements. Both the node areas and the tabs are configured such that they are flexurally softer than the base elements.

17 Claims, 4 Drawing Sheets

COUPLING AND ANGULAR POSITION MEASURING DEVICE USING THE COUPLING

CROSS-REFERENCE TO RELATED APPLICATIONS

The present application claims priority to Application No. 10 2005 027 071.9, filed in the Federal Republic of Germany on Jun. 11, 2005, and to Application No. 10 2006 020 067.5, filed in the Federal Republic of Germany on Apr. 29, 2006, each of which is expressly incorporated herein in its entirety by reference thereto.

FIELD OF THE INVENTION

The present invention relates to a coupling for connecting two component parts, e.g., a compensation coupling that is rigid against rotation, which acts elastically in the axial and radial directions. The present invention also relates to an angular position measuring device which includes such a coupling.

BACKGROUND INFORMATION

Angular position measuring devices, also referred to as shaft encoders, are used for measuring rotary motions of a rotationally mounted member, e.g., a shaft, over one or more revolutions (multiturn functioning). In so doing, the rotary motion is recorded incrementally or absolutely. In conjunction with gear racks and gear wheels or with threaded spindles, linear motions can also be measured by an angular position measuring device.

In order to adjust alignment errors, for example, between the shaft of an angular position measuring device and the shaft to be measured, couplings are frequently used. The shaft of the angular position measuring device can then be fitted rigidly to the shaft to be measured. The coupling compensates for the axial and radial relative motions between the shaft to be measured and the measuring unit of the coupling, and it reduces the forces generated thereby. So that the measuring results are not corrupted, the respective coupling should behave in a manner that is rigid or torsion resistant.

A coupling is described in PCT International Published Patent Application No. WO 01/02808 that has four links or tabs which are each offset by 90°. In this context, two opposite links that are aligned in parallel are each fastened to the same component part. This arrangement is believed to have the disadvantage that, among other things, the respective coupling may require a great deal of space comparatively speaking, for angular position measuring devices having large shaft diameters (e.g., for those having hollow shafts for accommodating a shaft that is to be measured).

SUMMARY

Example embodiments of the present invention may provide a coupling that has excellent mechanical properties, requires a comparatively low construction volume and is extremely economical to produce. Furthermore, a precisely operating angular position measuring device may be provided, which has comparatively small external measurements, even for large shaft diameters.

The coupling may be used for the connection of two component parts that is axially and radially elastic, but torsion resistant, the coupling including base elements and a plurality of tabs that are integrally formed with the base element at the node areas. Each tab has at least two points of support that are distanced from each other in the circumferential direction. In each case, one of the node areas is between points of support in the circumferential direction, one node area forming the connection of a tab to a base element. In doing so, at least one of the tabs is able to be fastened at its points of support to one of the two component parts, and at least an additional one of the tabs is able to be fastened at its points of support to the other of the two component parts in a rigid manner. Both the node areas and the tabs are configured such that the latter are considerably more flexurally soft than the base elements.

In this regard, the flexural softness refers substantially to the reaction of the node areas and the tabs to an initiation of radially or axially directed forces.

Accordingly, the tabs are connected to the base elements via the node areas, e.g., similar to the members of a pin-joined frame, which are connected to one another via a punctiform node. Thus, in an ideal case, the node area may be reduced to a punctiform node. In reality, the node area is similar to a flexurally soft solid joint. Thus the angle enclosed by adjoining base elements may change in response to stress during the operation of the coupling.

The points of support at the appertaining tabs may be at a distance T from one another, the corresponding tabs being integrally formed with the node areas, all the way over a length t. For example, with regard to the flexural properties in the axial and/or radial direction, the ratio T/t of the distance T to length t may be least 3, e.g., at least 5, e.g., at least 7 or 8. In this context, the tab may also be integrally formed at the corresponding node area, while having interrupted recesses or being perforated over the length t.

For improving the flexural properties, the coupling may be arranged such that in each case in the radial direction, the node areas have a smallest extension x, and the base elements a greatest extension R, the ratio R/x amounting, e.g., to at least 1.75, e.g., at least 2, and, e.g., at least 2.5 or at least 3.

It should be understood that points of support refer to geometrical areas in which the tab is able to be fastened rigidly to an additional component part.

The coupling may be made of one. and the same material, for example, of metal, e.g., steel, and, it may be formed in one piece of sheet metal.

The coupling may be arranged to be flat, e.g., made from flat sheet metal. Accordingly, the coupling may not be a spatial object, e.g., not a sheet metal part that is spatially bent.

Because of the foregoing, a large, unobstructed inside diameter of the coupling may be achieved, without excessively increasing the outer dimensions of the coupling or the entire angular position measuring device. The unobstructed inside diameter may also be seen as a free opening, for a shaft, for example. The coupling may be constructed geometrically such that the unobstructed inside diameter amounts to at least 60%, e.g., at least 70%, of its maximum outside diameter. Despite this relatively large unobstructed inside diameter, the coupling may nevertheless be exceedingly torsion resistant.

The coupling may include a number $2 \cdot n$ of tabs and/or base elements, n being a natural number greater than or equal to 3, e.g., equal to 4 or 5.

According to an example embodiment of the present invention, a coupling for a connection of two component parts that is radially elastic and torsion resistant includes: base elements; and a plurality of tabs integrally formed with the base elements at node areas, the tabs including two support points at a distance from one another in a circumferential direction, each node area arranged between support points and forming a connection of the tabs to the base elements, at least one of the tabs rigidly fixable at its support points to a first one of the component parts and at least another one of the tabs rigidly fixable at its support points to a second one of the component parts, the node areas and the tabs flexurally softer than the base elements.

The tabs may include two support points at a distance from each other, the tabs may be formed integrally to the node areas over a length, and a ratio of the distance to the length may be at least 3, e.g., at least 5.

A ratio of a greatest extension of the base elements in a radial direction to a smallest extension of the node areas in the radial direction may be at least 1.75, e.g., at least 2.5.

The coupling may be arranged centrosymmetrically with respect to a center, and the base elements may be arranged closer to the center than the tabs.

The coupling may include a number 2·n of tabs, n being a natural number greater than or equal to 3.

The coupling may include a number 2·n of base elements, n being a natural number greater than or equal to 3.

An unobstructed inside diameter of the coupling may be at least 60% of a maximum outside diameter of the coupling.

The coupling may be formed in one piece of sheet metal.

The coupling may be planar.

The tabs may be slotted.

The base elements may be geometrically arranged so that an extension of the base elements in a radial direction increases with increasing distance from the node areas.

The base elements may be arranged symmetrically with respect to a radially directed line.

According to an example embodiment of the present invention an angular position measurement device includes: a first component part; a second component part, the first component part and the second component part displaceable with respect to each other; and a coupling fastened to the first component part and the second component part. The coupling may be arranged as described above.

The angular position measurement device may include a hollow shaft.

The coupling may include an unobstructed inside diameter, and the angular position measurement device may include a shaft penetrating the coupling all the way through the unobstructed inside diameter.

Other features and aspects of example embodiments of the present invention are described in more detail below with reference to the appended Figures.

DETAILED DESCRIPTION

Figure 1:
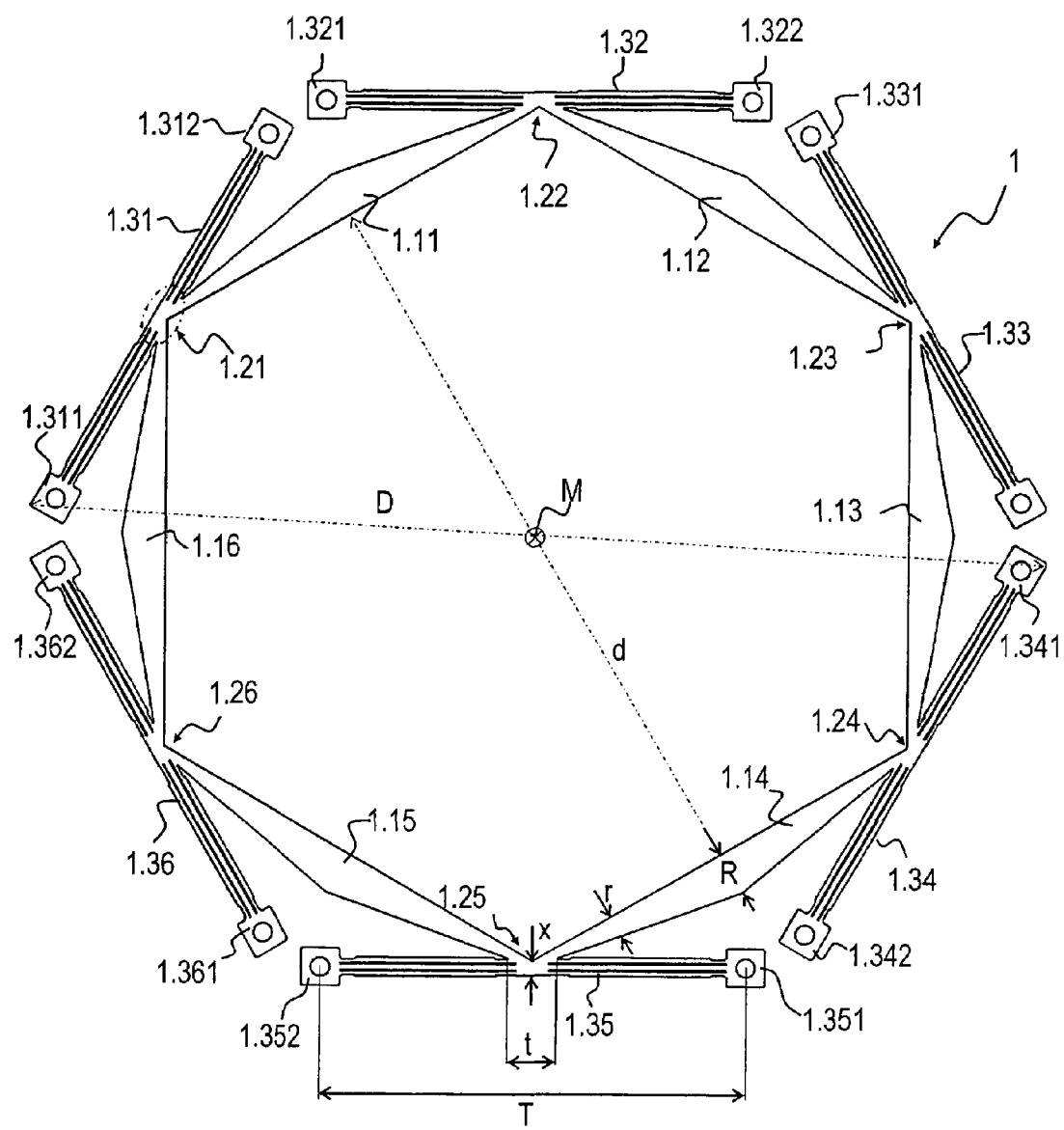
FIG. 1 is a top view of a coupling.

FIG. 1 is a top view of coupling 1 according to an example embodiment of the present invention. Coupling 1 is formed in one piece of sheet metal, the outer contours having been cut out of 2 mm thick flat sheet metal by a punching process. Coupling 1 includes six base elements 1.11 to 1.16 and six links or tabs 1.31 to 1.36. Between base elements 1.11 to 1.16, six node areas 1.21 to 1.26 are also arranged. At node areas 1.21 to 1.26, tabs 1.31 to 1.36 are correspondingly integrally formed over a length t. Thus, the connecting area of the tabs 1.31 to 1.36 to the node areas 1.21 to 1.26 has the length t. Although length t is illustrated only once in FIG. 1, this geometric view applies to all node area 1.21 to 1.26 and tabs 1.31 to 1.36. For clarity, dimensioning of other corresponding lengths is not provided. In FIG. 1, for example, node area 1.21 is indicated by an elliptical dash-dot line.

Coupling 1 may be arranged centrosymmetrically with respect to a center M. As illustrated in FIG. 1, in a corresponding manner, base elements 1.11 to 1.16, tabs 1.31 to 1.36 and node areas 1.21 to 1.26 are all positioned centrosymmetrically with respect to center M. Furthermore, base elements 1.11 to 1.16 are arranged closer to center M than tabs 1.31 to 1.36. The symmetrical arrangement of coupling 1 has the result that deformations of coupling 1 are evened out in the operation of an angular position measuring device equipped with it, which may ultimately have a positive effect on the measuring accuracy of the angular position measuring device.

Coupling 1 has a comparatively large unobstructed inside diameter d. The unobstructed inside diameter d in this exemplary embodiment is the diameter of the smallest circle around center M which touches the inner contour of coupling 1. Correspondingly, outside diameter D is the diameter of the largest circle around center M which touches the outer contour of coupling 1. The unobstructed inside diameter d and outside diameter D are determinative sizes for the space required for coupling 1 and the angular position measuring device. In the exemplary embodiment illustrated, the ratio d/D amounts, e.g., to approximately 73%.

In the following discussion, the direction perpendicular to the drawing plane of FIG. 1 is designated as the axial direction. Radial direction corresponds to a direction that is directed outwardly away from center M, and tangential direction corresponds to a direction orthogonal to the radial and the axial directions.

In a first approximation, the shape of base elements 1.11 to 1.16 may be described as a triangle, whose two short sides are outside with respect to center M. The long side is aligned with the tangential direction (starting from the middle of the long side). Base elements 1.11 to 1.16 also have a radial extension r, R, which decreases in the direction toward node areas 1.21 to 1.26. Expressed in other words, base elements 1.11 to 1.16 are geometrically arranged so that their extension r; R increases with increasing distance from node areas 1.21 to 1.26. Because of this geometrical alignment and arrangement, base elements 1.11 to 1.16 are exceedingly flexurally stiff with respect to tangential and radial forces.

Furthermore, base elements 1.11 to 1.16 are arranged symmetrically with respect to an imaginary, radially directed line, which extends through the intersection of the two short sides.

Each of the six tabs 1.31 to 1.36 has two support points 1.311 to 1.362, that are distanced from each other by a distance T in the circumferential direction. Support points 1.311 to 1.362 are arranged as square regions, each having a bore. In order for tabs 1.31 to 1.36 to behave in a flexurally soft manner even when they are stressed by torsional forces, they are arranged to be comparatively narrow and long, and, in addition, they are slotted. The slots, and the bores also, are cut into the sheet metal by a laser process. Among other things, because of the comparatively great distance T and the narrow radial extension of tabs 1.31 to 1.36, tabs 1.31 to 1.36 are comparatively flexurally soft in the axial and the radial direction. In particular, tabs 1.31 to 1.36 are narrower at their narrowest places in the radial direction than the largest radial extension R of base elements 1.11 to 1.16. This property is supported by the slotted design of tabs 1.31 to 1.36.

While tabs 1.31 to 1.36 are described as including slots, it should be understood that tabs 1.31 to 1.36 may be arranged without slots, e.g., tabs 1.31 to 1.36 are slotless.

Each of node areas 1.21 to 1.26 is between two support points 1.311 to 1.362, node areas 1.21 to 1.26 forming the connection of tabs 1.31 to 1.36 to base elements 1.11 to 1.16. The node areas 1.21 to 1.26 act as solid joints. Because of the correspondingly adapted geometrical arrangement of node areas 1.21 to 1.26, a relative possibility of motion, substantially in the radial direction, is imparted to two adjoining tabs 1.31 to 1.36 and base elements 1.11 to 1.16, while using the material elasticity. The geometry is adapted such that great mechanical stresses occur in response to radial or axial stressing of coupling 1 in node areas 1.21 to 1.26. For this reason, node areas 1.21 to 1.26 have a smallest extension x in the radial direction, as illustrated in FIG. 1. Thus, the material strength in the radial direction in node areas 1.21 to 1.26 is considerably reduced. Node areas 1.21 to 1.26 and tabs 1.31 to 1.36 are thus configured such that they are considerably flexurally softer than base elements 1.11 to 1.16. The flexural softness refers to radial and/or axial stresses. Accordingly, radial and/or axial stresses lead to deformations in node areas 1.21 to 1.26 and in tabs 1.31 to 1.36. In other words, the axial angular impulse of base elements 1.11 to 1.16 about radially aligned axes and about axial (orthogonal to the drawing plane of FIG. 1, 4 or 5) axes is substantially greater than the corresponding axial angular impulse of node areas 1.21 to 1.26 and tabs 1.31 to 1.36. For this reason, base elements 1.11 to 1.16 are arranged so that they taper toward node areas 1.21 to 1.26, and that their extension r, R in the radial direction increases with increasing distance from node areas 1.21 to 1.26.

For the positive design of the flexural properties of the coupling, the ratio T/t of distance T to length t is selected such that it amounts, e.g., to 9, in the example embodiment illustrated. For the same purpose, the ratio R/x of greatest extension R of base elements 1.11 to 1.16 to the smallest extension x of node areas 1.21 to 1.26 is approximately, e.g., 3.5, in this example embodiment.

On the other hand, coupling 1 may be exceedingly torsion resistant, so that, in response to tangential forces into support points 1.311 to 1.362, practically no deformations may occur, which is of significance to an exact determination of the angular position.

Figure 2:
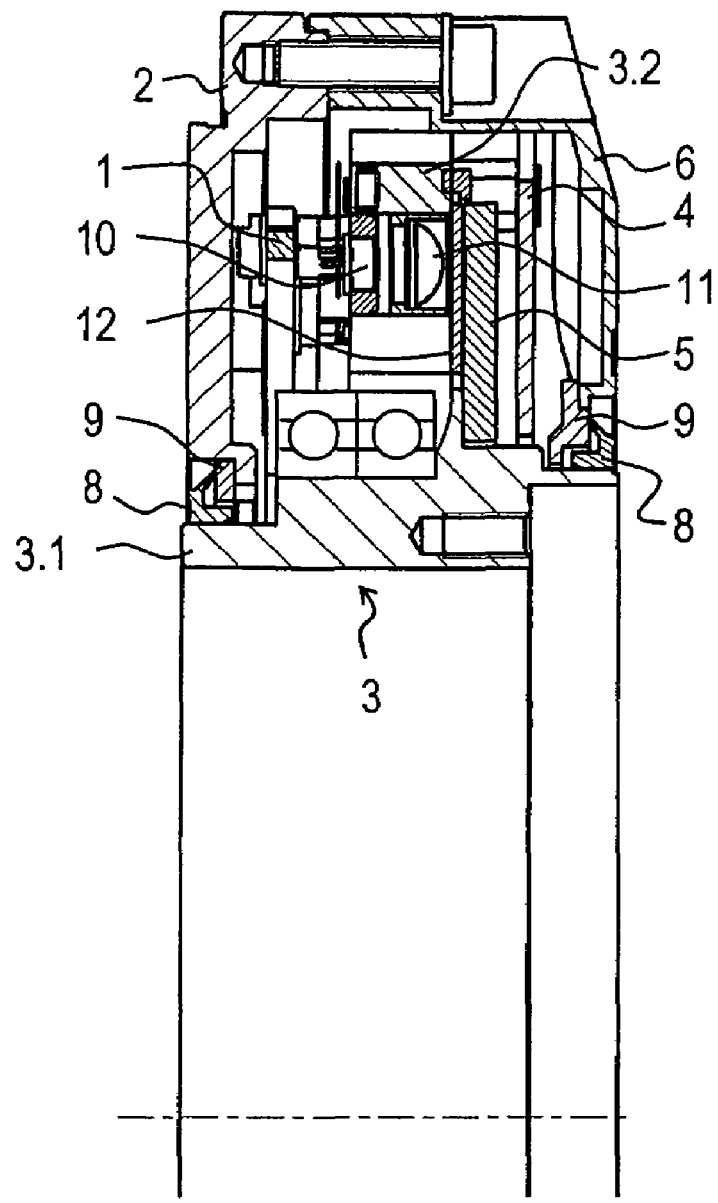
FIG. 2 is a partial cross-sectional view of an angular position measuring device with the coupling.

FIG. 2 is a partial cross-sectional view of an angular position measuring device and its measuring technology apparatus. The angular position measuring device has a bearing unit 3, which includes as a component part an outer ring 3.2 and a hollow shaft 3.1 that is rotatable with respect to outer ring 3.2. As illustrated in FIG. 2, rotatable hollow shaft 3.1 is arranged such that it penetrates coupling 1 all the way through unobstructed inside diameter d.

On hollow shaft 3.1, there is a scale disk 5, on which there is an angular division, or a scaling division, that is affixed by an adhesive in a torque proof manner. A scanning board 4 is fastened to outer ring 3.2, for example, by using screws. A light source, e.g., an LED 10, sends light through a lens 11 and a scanning plate 12 furnished with a line graduation. LED 10, lens 11 and scanning plate 12 are assigned in this context, to the stationary (not rotating) part of the angular position measuring device.

Counter to this, scale disk 5 is fastened to rotatable hollow shaft 3.1. By its angle scaling, scale disk 5 is able to modulate the incident light correspondingly to the angular setting of hollow shaft 3.1. The modulated light then impinges upon photodetectors of scanning board 4. Photoelectric signals result from this, which include the information concerning the angular setting of hollow shaft 3.1. The photoelectrically generated signals are processed further by electronic component parts on scanning board 4. The position signals that have been further processed are output via a cable 7 (see, e.g., FIG. 3) to an additional unit, for example, to a control device of a machine.

Figure 3:
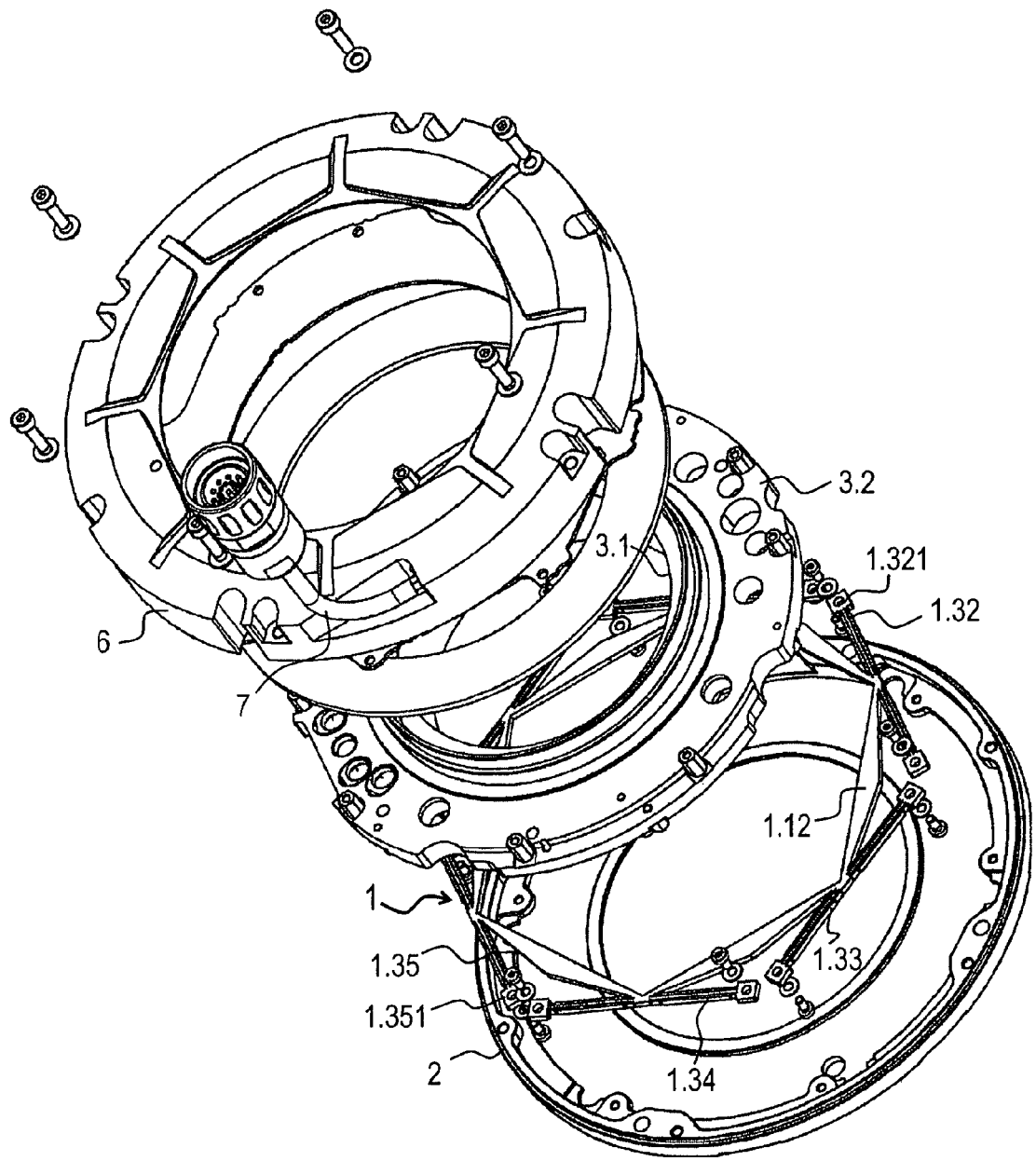
FIG. 3 is an exploded view of the angular position measuring device.

FIG. 3 is an exploded view of the angular position measuring device with coupling 1. For clarity, not all reference numerals for the component parts of coupling 1 are provided in FIG. 3. In this regard, reference is made to FIG. 1.

Three tabs 1.31, 1.33, 1.35 of coupling 1 are connected to outer ring 3.2 In the exemplary embodiment illustrated, for this purpose, screws are placed through the bores in support points 1.311, 1.312, 1.331, 1.332, 1.351, 1.352, and are screwed into inner threads of outer ring 3.2. Consequently, three tabs 1.31, 1.33, 1.35 are rigidly fastened at their six support points 1.311, 1.312, 1.331, 1.332, 1.351, 1.352 to bearing unit 3, e.g., at outer ring 3.2.

The other tabs 1.32, 1.34, 1.36 are rigidly fastened to another component part of the angular position measuring device, e.g., flange 2. For this, the bores in support points 1.321, 1.322, 1.341, 1.342, 1.361, 1.362 are provided with screws, and tabs 1.32, 1.34, 1.36 are correspondingly fastened rigidly to flange 2. Thus, in the exemplary embodiment illustrated, adjacent tabs 1.31 to 1.36 are rigidly fastened in each case to a different component part, e.g., outer ring 3.2 and flange 2, outer ring 3.2 and flange 2 not rotating in the operation of the angular position measuring device, but being still displaceable relatively to each other. Consequently, those tabs 1.31, 1.33, 1.35 of coupling 1 which are connected to outer ring 3.2, are opposite, with respect to center M, to the three other tabs 1.32, 1.34, 1.36 that are fastened to flange 2. Onto flange 2, a closing cap 6 is set and is screwed onto it.

Because of coupling 1, a shaft that is to be measured may be mounted rigidly and torsion resistant in hollow shaft 3.1 of the angular position measuring device, while flange 2 may be firmly attached to a housing, and, in this context, alignment errors are compensated for, within admissible tolerances. This means that, during one revolution of hollow shaft 3.1, motions of deformation occur in node areas 1.21 to 1.26 and tabs 1.31 to 1.36, and both in the axial and the radial direction, as a function of the actually present errors.

Figure 4:
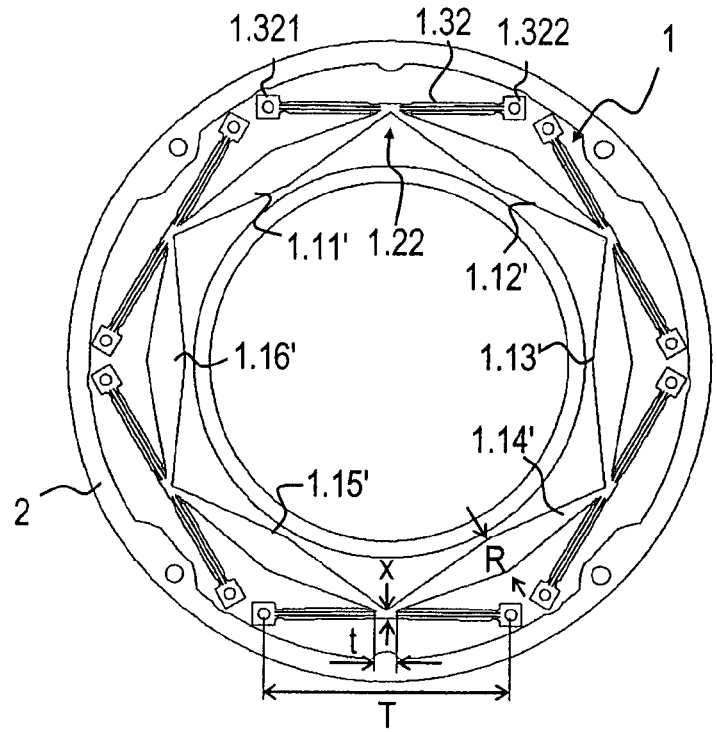
FIG. 4 is a top view of an installed coupling without radial stress.
Figure 5:
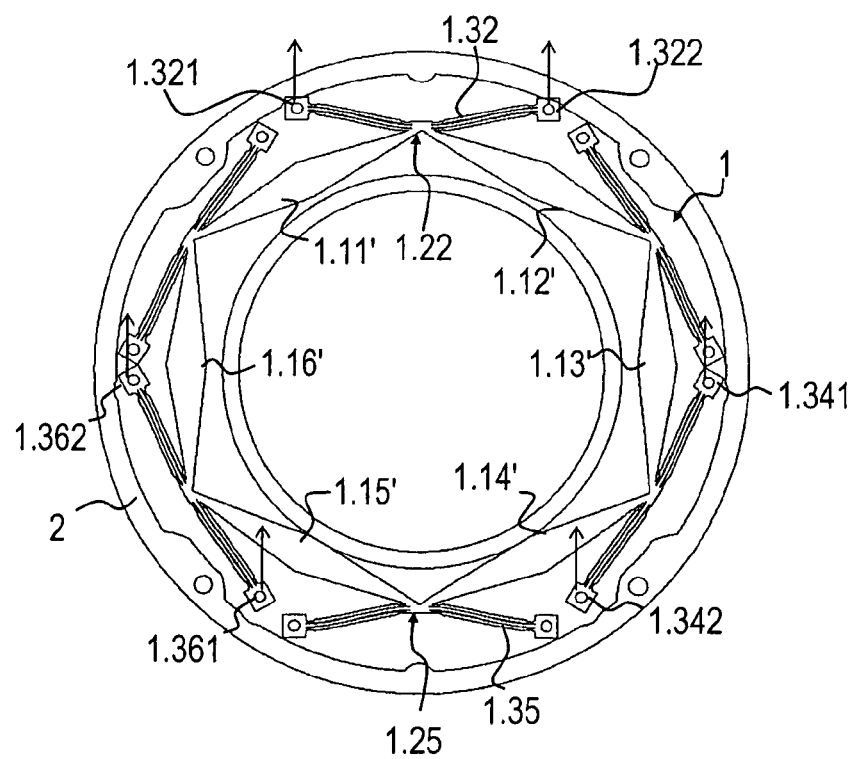
FIG. 5 is a top view of an installed coupling having radial stress, in which the deformations are not drawn to scale.

The functioning of coupling 1 may be described illustratively with reference to FIGS. 4 and 5. In contrast to FIG. 1, base elements 1.11' to 1.16' of coupling 1 have a geometry that is essentially rhombic, in the simulation model, in this example.

FIG. 4 illustrates the coupling in a state in which it is not stressed radially, and accordingly it also has no deformations. If, however, as a result of an alignment error, a radially directed force impinges upon the coupling, deformations are created, as illustrated in FIG. 5, on an exaggerated scale. Support points 1.321, 1.322, 1.341, 1.342, 1.361, 1.362 are rigidly fastened to one and the same component part. Because of the simulated misalignment, there is created a relative motion of this component part with respect to the other component part to which the remaining support points 1.311, 1.312, 1.331, 1.332, 1.351, 1.352 are fastened. As illustrated in FIG. 5, this relative motion has a direction vertically upwardly in the drawing plane, so that support points 1.321, 1.322, 1.341, 1.342, 1.361 1.362 have moved relatively, according to the direction of the arrows illustrated. It is illustrated that maximum deformations occur in the node areas and the tabs, e.g., in the two node areas 1.22 and 1.25, as well as in tabs 1.32 and 1.35. In base elements 1.11' to 1.16', even in response to extreme strains that are indicated disproportionally, no deformations at all are able to be detected. Thus, both node areas 1.21 to 1.26 and tabs 1.31 to 1.36 are considerably softer flexurally than base elements 1.11' to 1.16'. As illustrated in FIG. 5, in the deformation state, in contrast to the usual coupling, the angles between adjacent base elements 1.11' to 1.16' are changed with respect to the unstressed state. For example, the angle between base elements 1.11' and 1.12' is increased, and in a manner so that base elements 1.11' and 1.12' are quasi swiveled about an imaginary point in node area 1.22. Still, as a whole, the coupling remains torsion resistant, axial errors and radial alignment errors being able to be compensated for. As described above, the coupling is arranged in a completely planar manner, radial and/or tangential forces not leading to any deformation in the axial direction. This behavior, in addition, contributes to a great torsion resistance.

In an exemplary embodiment, ratio T/t of distance T to length also amounts, e.g., to 9, while the ratio R/x of the greatest extension R of base elements 1.11' to 1.16' to the smallest extension x of node areas 1.21 to 1.26 amounts, e.g., to approximately 4.5, in this example.

In the case of coupling 1, as described in the exemplary embodiment, three tabs 1.31, 1.33, 1.35 are connected to outer ring 3.2, while the other tabs 1.32, 1.34, 1.36 are fastened to flange 2. Tabs 1.31, 1.33, 1.35 1.32, 1.34, 1.36, which are each connected to one and the same component part, are also not aligned parallel to one another. For this reason, for couplings 1, which have a number 2·n of tabs 1.31 to 1.36 and or base elements 1.11 to 1.16, 1.11' to 1.16' (n being≧3) there is present a complex deformation pattern in response to stresses. Because of the arrangement according to example embodiments of the present invention, coupling 1 is nevertheless torsion resistant, and is flexurally soft in the axial and the radial direction. However, advantages of the relatively large number of tabs 1.31 to 1.36 and/or base elements 1.11 to 1.16, 1.11' to 1.16' may include, as mentioned above, that a comparatively large unobstructed inside diameter d, and thus a large free opening is able to be achieved for hollow shaft 3.1. On the other hand, this construction may make it possible to keep the outside diameter D of coupling 1, and thus also the outer dimensions of the angular position measuring device relatively low.

Although coupling 1 connects two component parts 2, 3 of the angular position measuring device that are not rotatable (stator coupling), example embodiments of the present invention are also applicable to angular position measuring devices in which the corresponding coupling 1 is used as a rotor coupling. In the latter case, the coupling is rigidly fastened to two rotatable component parts, these rotatable component parts also being displaceable relative to each other.

What is claimed is:

1. A coupling for a connection of two component parts that is radially elastic and torsion resistant, comprising:
   base elements; and
   a plurality of tabs integrally formed with the base elements at node areas, the tabs including two support points at a distance from one another in a circumferential direction, each node area arranged between support points and forming a connection of the tabs to the base elements, at least one of the tabs rigidly fixable at its support points to a first one of the component parts and at least another one of the tabs rigidly fixable at its support points to a second one of the component parts, the node areas and the tabs flexurally softer than the base elements.

2. The coupling according to claim 1, wherein the tabs include two support points at a distance from each other, the tabs formed integrally to the node areas over a length, a ratio of the distance to the length being at least 3.

3. The coupling according to claim 1, wherein the tabs include two support points at a distance from each other, the tabs formed integrally to the node areas over a length, a ratio of the distance to the length being at least 5.

4. The coupling according to claim 1, wherein a ratio of a greatest extension of the base elements in a radial direction to a smallest extension of the node areas in the radial direction is at least 1.75.

5. The coupling according to claim 1, wherein a ratio of a greatest extension of the base elements in a radial direction to a smallest extension of the node areas in the radial direction is at least 2.5.

6. The coupling according to claim 1, wherein the coupling is arranged centrosymmetrically with respect to a center, the base elements arranged closer to the center than the tabs.

7. The coupling according to claim 1, wherein the coupling includes a number 2·n of tabs, n being a natural number greater than or equal to 3.

8. The coupling according to claim 1, wherein the coupling includes a number 2·n of base elements, n being a natural number greater than or equal to 3.

9. The coupling according to claim 1, wherein an unobstructed inside diameter of the coupling is at least 60% of a maximum outside diameter of the coupling.

10. The coupling according to claim 1, wherein the coupling is formed in one piece of sheet metal.

11. The coupling according to claim 1, wherein the coupling is planar.

12. The coupling according to claim 1, wherein the tabs are slotted.

13. The coupling according to claim 1, wherein the base elements are geometrically arranged so that an extension of the base elements in a radial direction increases with increasing distance from the node areas.

14. The coupling according to claim 1, wherein the base elements are arranged symmetrically with respect to a radially directed line.

15. An angular position measurement device, comprising:
   a first component part;
   a second component part, the first component part and the second component part displaceable with respect to each other; and
   a coupling fastened to the first component part and the second component part, the coupling radially elastic and torsion resistant, the coupling including:
      base elements; and
      a plurality of tabs integrally formed with the base elements at node areas, the tabs including two support points at a distance from one another in a circumferential direction, each node area arranged between support points and forming a connection of the tabs to the base elements, at least one of the tabs rigidly fixable at its support points to a first one of the component parts and at least another one of the tabs rigidly fixable at its support points to a second one of the component parts, the node areas and the tabs flexurally softer than the base elements.

16. The angular position measurement device according to claim 15, further comprising a hollow shaft.

17. The angular position measurement device according to claim 15, wherein the coupling includes an unobstructed inside diameter, the angular position measurement device further comprising a shaft penetrating the coupling all the way through the unobstructed inside diameter.

* * * * *